United States Patent
Paspirgilis

(10) Patent No.: US 8,272,630 B2
(45) Date of Patent: Sep. 25, 2012

(54) DEVICE FOR FIXING ESPECIALLY SURFACE-LIKE WORKPIECES HAVING AN ATTACHMENT SURFACE

(75) Inventor: Bernd Paspirgilis, Steinbergkirche (DE)

(73) Assignee: Airbus Operations GmbH (DE)

( * ) Notice: Subject to any disclaimer, the term of this patent is extended or adjusted under 35 U.S.C. 154(b) by 1375 days.

(21) Appl. No.: 11/630,817

(22) PCT Filed: Jun. 30, 2005

(86) PCT No.: PCT/EP2005/007072
§ 371 (c)(1), (2), (4) Date: Dec. 27, 2006

(87) PCT Pub. No.: WO2006/002929
PCT Pub. Date: Jan. 12, 2006

(65) Prior Publication Data
US 2008/0048373 A1  Feb. 28, 2008

(30) Foreign Application Priority Data
Jul. 1, 2004 (DE) .......................... 10 2004 031 863

(51) Int. Cl.
*B25B 1/20* (2006.01)
(52) U.S. Cl. ............................. 269/37; 269/900
(58) Field of Classification Search ............. 269/37, 269/289 R, 302.1, 900, 908
See application file for complete search history.

(56) References Cited

U.S. PATENT DOCUMENTS

| | | | |
|---|---|---|---|
| 2,465,725 A * | 3/1949 | Herzmark | 601/28 |
| 3,806,116 A * | 4/1974 | Malmberg et al. | 482/147 |
| 4,420,135 A * | 12/1983 | Munz | 248/633 |
| 5,222,649 A | 6/1993 | Funari et al. | |
| 5,516,030 A | 5/1996 | Denton | |
| 6,439,559 B1 * | 8/2002 | Kinnard et al. | 269/21 |
| 6,537,642 B1 * | 3/2003 | Jacquet | 428/99 |
| 6,655,671 B2 | 12/2003 | Iwaki | |
| 6,663,537 B2 * | 12/2003 | McCoy | 482/23 |
| 2002/0048925 A1 | 4/2002 | Marsh et al. | |
| 2005/0107870 A1 * | 5/2005 | Wang et al. | 623/1.44 |
| 2008/0048373 A1 * | 2/2008 | Paspirgilis | 269/21 |

FOREIGN PATENT DOCUMENTS

DE 2 236 936 A1 3/1974

(Continued)

OTHER PUBLICATIONS

Office Action from Japanese Application No. 2007-518543, dated Oct. 4, 2011. (Machine translation included).

(Continued)

*Primary Examiner* — Lee D Wilson
(74) *Attorney, Agent, or Firm* — Lerner, David, Littenberg, Krumholz & Mentlik, LLP

(57) ABSTRACT

A device for fixing especially surface-like workpieces has a flexible attachment surface at least one holding device which holding devices may be embodied as spheres which are held in openings by an elastic surface-like component in a resilient manner. Between the elastic surface-like component and the attachment surface, there exists a reduced pressure, so that, as a consequence of the reduced pressure, or the air pressure of the ambience, respectively, a workpiece resting at the attachment surface is pressed against the attachment surface 2. Consequently, spheres are pressed out of the openings only where the workpiece rests on the attachment surface in order to be held.

16 Claims, 1 Drawing Sheet

FOREIGN PATENT DOCUMENTS

Figure 1:
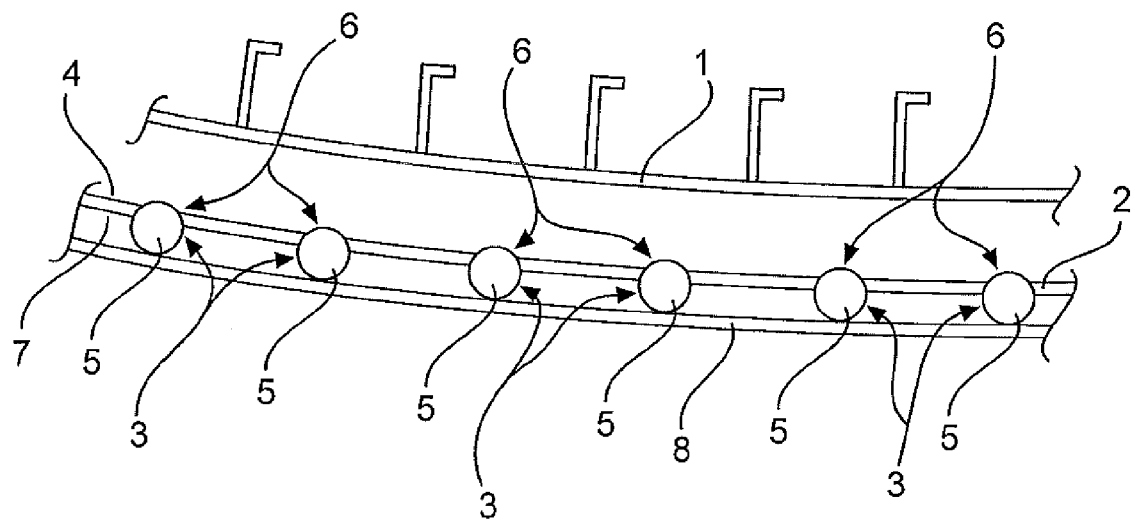

| | | | |
|---|---|---|---|
| DE | 296 13 784 U1 | 2/1997 |
| DE | 297 17 608 U1 | 3/1999 |
| EP | 0 534 841 A1 | 3/1993 |
| EP | 0 629 468 A1 | 12/1994 |
| GB | 1 323 415 A | 7/1973 |
| GB | 2 120 141 A | 11/1983 |
| GB | 2 129 141 A | 11/1983 |
| JP | 59124679 | 8/1984 |
| JP | 04319096 A | 11/1992 |
| JP | 09103912 A | 4/1997 |
| JP | 11291088 A | 10/1999 |
| JP | 2002336964 A | 11/2002 |
| JP | 2003164988 A | 6/2003 |
| SU | 1350120 A1 | 11/1987 |
| SU | 1373607 | 2/1988 |
| SU | 1373667 A1 | 2/1988 |

OTHER PUBLICATIONS

Office Action from Canadian Application No. 2568518, dated Dec. 28, 2011.

* cited by examiner

DEVICE FOR FIXING ESPECIALLY SURFACE-LIKE WORKPIECES HAVING AN ATTACHMENT SURFACE

FIELD OF THE INVENTION

The present invention relates to a device for fixing a surface-like workpiece.

TECHNOLOGICAL BACKGROUND

Devices for fixing workpieces while carrying out treatment processes of any kind are known in the state of the art in various variations.

If, for example welding works or rivet works are to be carried out at larger components, it is necessary to support or fix, respectively, the component by means of a suitably formed accommodating device, while carrying out the treatment processes. Thereby, on the one hand, the warping of the component is avoided, to the other hand, the component is securely and firmly held, while carrying out the welding works. In order to fix the component, a known receiving device, especially a welding bowl, has channels milled-in at its upper side facing the component, for example, by means of which, a reduced pressure may be created below the component resting thereon, so that the air pressure of the ambience presses the component firmly against the receiving device, and thereby effects the mechanical fixing. In this context, the surface geometry of the receiving device is adapted to the component to be worked at. Receiving devices of such kind are often formed from a metallic material.

If the component to be worked at has recesses, for example, the receiving device has to be adapted accordingly. In the region of the recesses of the component, there must not proceed any channels, for example, because otherwise there cannot be created an effective reduced pressure below the component. This requirement causes a time intensive and cost intensive adaptation of the receiving device, when changing design aspects of the component. Channels extending in the region of newly introduced component-recesses have to be filled by welding again, or, in other regions of the component, there have to be milled-in other channels into the receiving device.

SUMMARY OF THE INVENTION

It may be seen as an object of the invention, to create a universal receiving device, which allows for a fixing of components embodied in various forms possibly having component recesses for the purpose of a treatment.

According to an exemplary embodiment, an attachment surface is flexible, and has at least one holding device. This may allow to hold or fix components or workpieces having various geometric dimensions or varying component recesses, respectively, for the purpose of further treatment.

An advantageous embodiment of the invention provides that at least one holding device is formed by openings introduced into the attachment surface at least in certain areas, and that these may be closed by closing devices. By means of this embodiment, it may become possible to fix a workpiece at the attachment surface by means of a reduced pressure or negative pressure or the effect of the ambient air pressure, respectively.

A further exemplary embodiment provides that the closing devices be held in the openings in a resilient manner by means of an elastic surface-like part. At first, by means of this embodiment, it may be ensured that the closing devices cannot fall out of the openings. Moreover, the elastic surface-like part applies a defined force to the closing devices such that the closing devices or elements close the openings with a predetermined bias tension. Therefore, the closing devices deblock the openings only in those regions, at which a workpiece rests with a sufficient surface pressing. Finally between the elastic surface-like part and the attachment surface, a space which is closed to all sides may be created, in which a reduced pressure or negative pressure may be built up.

A further exemplary embodiment of the device provides that in a region between the attachment surface and the elastic surface-like part there a reduced pressure or negative pressure may be provided.

In this manner, as a consequence of the ambient air pressure, the workpiece may almost completely be pressed onto the attachment surface, in the ideal case.

According to a further exemplary embodiment of the device, in the region of the resting surface or supporting surface of the workpiece, the closing devices may be pressed out of the openings, whereby, due to the ambient air pressure, the workpiece is pressed or abutted against the attachment surface.

By means of this embodiment, it may be allowed that the holding devices or the reduced pressure or ambient air pressure quasi acting as holding devices in connection with the closing devices, only act sharply at those regions of the workpiece, where it rests at the attachment surface, because only in these regions, the closing devices are pressed out of the openings, so that the reduced pressure or the air pressure of the ambience, respectively, effects that the workpiece firmly abuts the attachment surface in those regions, or presses the workpiece against this attachment surface, respectively. If the workpiece has recesses, for example, then the closing devices remain closed in these regions, so that the reduced pressure is not drained via the recesses within the workpiece.

According to a further exemplary embodiment of the device, the attachment surface is embodied to be flexible in at least one spatial direction.

By means of the device according to this exemplary embodiment, it may be possible to also fix workpieces for treatment which are curved in several spatial directions.

According to a further exemplary embodiment of the invention, by means of suitable supporting devices which are positioned below the attachment surface and/or the elastic surface-like part, the attachment surface may be adapted to a surface geometry of the work piece at least in certain areas. This constructive embodiment may allow for the universal applicability of the device according to the invention to workpieces having different surface geometries.

A further exemplary embodiment of the invention provides, that the elastic surface-like part be formed of a synthetics material, especially a rubber material. To the one hand, the thereby caused high elasticity of the elastic surface-like part allows for the bending of the attachment surface in at least one spatial dimension. Moreover, due to the spring effect of the elastic surface-like part, the closing devices may seal the openings with a certain bias tension.

According to a further exemplary embodiment, the attachment surface is formed of a flexible material, especially of a sheet of steel. This embodiment may allow for an adaptation of the attachment surface to workpieces which are curved in at least one spatial dimension.

A further embodiment of the device provides, that the openings preferably are embodied as piercing bores or drilled through-holes having uniform distances with respect to each other.

Thereby, it may be possible to create the openings in the attachment surface in a simple manner.

According to a further exemplary embodiment of the device according to the invention, preferably a sphere is disposed in each bore as a/the closing device. By means of this exemplary embodiment, it may be possible to manufacture the device according to the invention in a simple and therefore cost saving manner. Moreover, the spheres may allow for a mostly air-tight closure of the openings in form of the bores.

A further exemplary embodiment provides, that the bores have sealing regions, at which the spheres are abutting. Thereby, the sealing effect of the abutting spheres in the holes may be further improved.

According to another exemplary embodiment of the invention, the device is adaptable to a plurality of different workpiece geometries or to workpieces having various surface geometries, respectively. Therefore, the universal device for fixing various workpieces according to the invention may be applied for the purpose of treatment.

SHORT DESCRIPTION OF THE DRAWINGS

Figure 2:
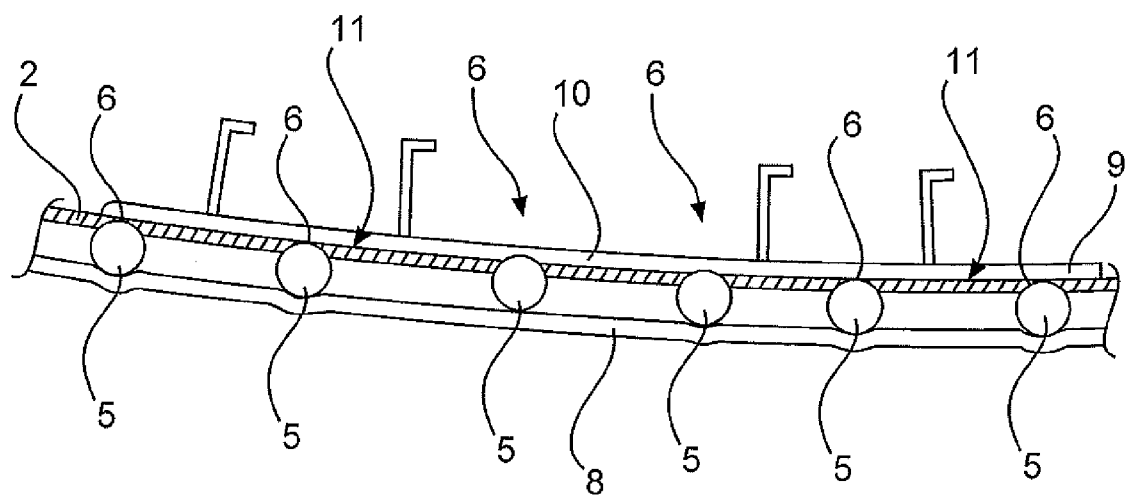

In the drawing:

FIG. 1 shows a cross section of the device according to an exemplary embodiment of the invention, wherein a workpiece is lifted-off from an attachment surface, and FIG. 2 shows a cross section of the device according to an exemplary embodiment of the invention, wherein a workpiece is resting-on in certain areas, and is fixed to the attachment surface by means of reduced pressure.

DETAILED DESCRIPTION OF EXEMPLARY EMBODIMENTS

FIG. 1 shows a cross section of an exemplary embodiment of the device according to the invention, wherein a workpiece 1 is lifted-off (as shown by arrows 20). An attachment surface 2 is formed to be flexible and possesses a concave surface geometry, which preferably is adapted to approximately the surface form of the workpiece 1. A plurality of holding devices 3 are disposed In the attachment surface 2. The holding devices 3 are preferably disposed at uniform distances with respect to each other, for example in raster form, and are therefore distributed in an essentially uniform manner with respect to the upper side 4 of the attachment surface 2. In the exemplary embodiment shown in FIG. 1, the holding devices 3 are also disposed into the depth of the space, perpendicularly to the plane of drawing. The representation of FIG. 1 shows a cross section of a portion of a row of the grid-form arrangement of the holding devices 3. In deviating from a uniform grid-form arrangement, the holding devices 3 may be disposed across the attachment surface 2 in arbitrary patterns in a distributed manner. Alternatively, it is also possible to only dispose the holding devices 3 in certain areas in individual regions of the attachment surface 2.

The holding devices 3 are respectively formed by spheres 5 for creating the closing devices, which in turn close openings 6 having a corresponding geometry. To this end, the openings 6 have respective sealing surfaces which are not shown in further detail in the drawing, and against which, for sealing, the spheres 5 are abutting at least in certain areas in a form closed manner.

The attachment surface 2 may be formed of a sufficiently strong, flexible plate, for example a sheet of steel, a synthetics plate, a composite material of steel and synthetics or the like. Alternatively, the attachment surface 2 may also be formed of an arbitrary combination of sheets of steel and synthetics materials. A plurality of bores having a diameter of about 5.5 mm are introduced into the attachment surface 2 in order to form the openings 6. In this case, the spheres 5 have a diameter of about 6 mm. In order to improve the sealing effect, the openings 6 are introduced from out of the lower side 7 of the attachment surface 2, and out of countersinks not shown in detail, in order to create the attachment surface 2. In this embodiment, the countersinks preferably have dimensions of 0.5 mm times 30° each. Alternatively, the sealing surfaces may be introduced into the attachment surface 2 from out of the upper side 4. In addition to the countersinks, sealing means, for example in form of synthetics inlays, may be disposed within the bores.

In deviating from the mentioned dimensions of the bores for creating the openings 6, these may be chosen smaller or larger as well, especially in case of very large or very small workpieces 1. In order to secure a sufficient sealing effect, the diameter of the spheres 5 is always somewhat larger than the respective diameter of the bore though. In order to secure a cost-effective manufacturing of the device, the spheres 5 preferably have standardised diameters. As far as manufacturing technology is concerned, by means of choosing a respective drill, the diameters of the bores then may easily and thereby cost-effectively be adapted to the predetermined standard diameter of the spheres 5 in an easy and thereby cost effective manner.

As an alternative to the spheres 5, in case of need, closing devices having a shaping which differs from the sphere geometry may be used for sealing the openings 6. The openings 6 then have to be adapted to the respective geometry of the closing devices, and are therefore no longer embodied as cylindrical bores.

By means of an elastic surface-like part 8, the spheres 5 are held in the openings 6 in a resilient manner, so that the spheres 5, if possible completely, close the openings 6 in an air-tight or gas-tight manner, respectively.

FIG. 2 shows the device according to the invention, together with a workpiece 9 resting on the attachment surface 2 at least in certain areas, and being fixed to/at the attachment surface 2 by means of reduced pressure or air pressure of the ambience, respectively. There exists a region, in which the workpiece 9 has a recess 10. Accordingly, the workpiece 9 abuts the attachment surface 2 with a resting surface 11 only in certain areas. Due to the mass of the workpiece 9, the spheres 5 are pressed out of the openings 6 basically only in the region of the resting surface 11.

Between the elastic surface-like part 8 and the attachment surface 2, there exists a reduced pressure Pr with respect to an ambient pressure Pa or negative pressure 22 which may, for example, be built up by means of a suitable vacuum unit, especially a vacuum pump or the like. The reduced pressure Pr serves for fixing the workpiece 9 at the attachment surface 2 by means of the reduced pressure or the air-pressure Pa of the ambience, respectively. The reduced pressure or the air-pressure of the ambience, respectively, substantially is only effective in those regions, in which the spheres 5 are pressed out of the openings 6, as a consequence of the mass of the resting-on workpiece 9.

As a consequence of the reduced pressure or the ambient air-pressure, respectively, the workpiece 9 is firmly pressed against the attachment surface 2, so that the workpiece 9 may be subjected to the intended treatment steps, as for example welding, riveting, gluing, and so on. Due to the device according to the invention, a secure fixing of the workpiece 9 at the attachment surface 2 is secured.

In the regions, in which a workpiece has recesses of larger area, the spheres 5 are not pressed out of the openings 6, so that the reduced pressure in these regions basically cannot escape, or no air from the ambience may flow in, respectively. If the openings 6 are partially freed or exposed by the spheres 5, for example in border regions of the workpiece 9 or possible recesses 10, and are not completely covered by the resting-on surface 11 at the same time, this is not problematic, because a sufficiently large dimensioned vacuum unit in any case generates or maintains, respectively, a sufficiently large reduced pressure between the attachment surface 2 and the elastic surface-like part 8 to compensate these losses.

Moreover, by means of correspondingly placed supporting devices which are not described in further detail in the drawing, the attachment surface 2 may be adapted to various surface geometries of workpieces. Thereby, these supporting devices are connected to the lower side 7 and/or to the elastic surface-like part 8 in a preferably articulated manner, and are supported by abutments which are not shown in further detail. For example hydraulic pistons, height adjustable spindles and so on may be used as supporting devices. In an especially preferred manner, the hydraulic pistons, the height adjustable spindles and the like are embodied in an electrically operatable manner. Moreover, if the spatial coordinates of the workpiece 9 to be worked at are present in numerical form, it is possible, for example, to automatically adjust the supporting devices by means of a calculating unit which is not shown in further detail, and to adapt the geometry of the attachment surface 2 to the surface geometry of different workpieces 1,9 in this way. By means of (a) respective adjusting of the supporting devices, the attachment surface 2 may be bent along one spatial direction, for example, so that a trough-form surface geometry results, similar to a cylinder mantle section. In addition, there may be provided a measuring apparatus for sensing the actually resulting surface geometry of the attachment surface 2, so that in case of deviations between target values and actual values of the surface geometry of the attachment surface 2, the supporting devices may be re-adjusted accordingly.

Therefore, the device according to the invention allows for the fixing of a variety of workpieces having various surface geometries and various recesses at the attachment surface 2. No time intensive and cost intensive individual conversion and adaptation of the device according to the invention to workpieces having various surface geometries and recesses is necessary. By means of one and the same device, various workpieces may be fixed for treatment, measuring and the like.

It should be noted that the term "comprising" does not exclude other elements or steps and the "a" or "an" does not exclude a plurality. Also elements described in association with different embodiments may be combined.

It should also be noted that reference signs in the specification or in the claims shall not be construed as limiting the scope of the invention.

LIST OF REFERENCE SIGNS 1 workpiece
2 attachment surface
3 holding devices
4 upper side
5 spheres
6 opening
7 lower side
8 elastic surface-like part
9 workpiece
10 recess
11 resting surface
Arrows 20
Negative pressure 22

The invention claimed is:

1. A device for fixing a workpiece, comprising:
   a flexible attachment surface;
   closing devices;
   an elastic component;
   wherein the attachment surface is provided with at least one holding device;
   wherein the at least one holding device comprises openings introduced into the attachment surface in at least one predetermined area;
   wherein the closing devices are provided for closing the openings; and
   wherein, when the closing devices are moved to the openings, the elastic component is provided for resiliently holding a plurality of closing devices in the openings.

2. The device of claim 1, further comprising:
   a region with a negative pressure between the attachment surface and the elastic component.

3. The device of claim 1, wherein the workpiece has a supporting area, the device further comprising:
   closing devices which are adapted to be pressed out of the openings adjacent to the supporting area of the workpiece such that the ambient air pressure presses the workpiece against the attachment surface.

4. The device of claim 1, wherein the attachment surface is flexible in at least one spatial dimension.

5. The device of claim 1, wherein the workpiece has surface geometry, the device further comprising:
   a plurality of supporting elements;
   wherein the plurality of supporting elements are provided below at least one of the attachment surface and the elastic component; and
   wherein the plurality of supporting elements adapt the attachment surface to the surface geometry of the workpiece.

6. The device of claim 1, wherein the elastic part comprises a synthetics material.

7. The device of claim 1, wherein the elastic part consists of a rubber material.

8. The device of claim 1, wherein the attachment surface is of a flexible material.

9. The device of claim 1, wherein the attachment surface consists of a sheet of steel.

10. The device of claim 1, wherein the openings are boreholes which are arranged at a uniform distance to each other.

11. The device of claim 8, further comprising:
    a plurality of spheres;
    wherein a respective sphere of the plurality of spheres is provided as respective closing element in each of the boreholes.

12. The device of claim 9, further comprising:
    a plurality of sealing regions;
    wherein each borehole is provided with a respective sealing region of the plurality of sealing regions;
       wherein the respective sphere abuts to the respective sealing region of the respective borehole in at least a region.

13. A device for fixing a workpiece comprising:
    a flexible attachment surface and an adjacent elastic component, the flexible attachment surface provided with at least one holding device comprising openings introduced into the flexible attachment surface in at least one predetermined area and closing devices having a default position closing the openings in an airtight manner through resilience of the elastic component, which elastic component is adapted for holding a plurality of closing devices in the respective openings;

wherein a workpiece dislodges one or more of said closing devices such that a pressure differential through said openings holds the workpiece against the flexible attachment surface.

14. The device of claim 13, further comprising a region of negative pressure between the attachment surface and the elastic component.

15. The device of claim 13, further comprising supporting elements to adapt the attachment surface to the surface geometry of the workpiece.

16. The device of claim 13, wherein the closing devices are spheres.

* * * * *